United States Patent [19]

Finn et al.

[11] Patent Number: 4,659,621

[45] Date of Patent: Apr. 21, 1987

[54] RELEASE AGENT DONOR MEMBER AND FUSING ASSEMBLY CONTAINING SAME

[75] Inventors: Patrick J. Finn, Webster, N.Y.; Linda M. Glover, Denver, Colo.; Arnold W. Henry, Pittsford; Adalbert A. Lux, Penfield, both of N.Y.

[73] Assignee: Xerox Corporation, Stamford, Conn.

[21] Appl. No.: 768,528

[22] Filed: Aug. 22, 1985

[51] Int. Cl.[4] ...................... B32B 25/20; G03G 15/20

[52] U.S. Cl. .................................... 428/339; 428/447; 118/60; 432/60; 432/228; 430/99

[58] Field of Search ................ 428/447, 339; 427/195, 427/387, 331, 450; 118/60; 432/60, 228; 430/99

[56] References Cited

U.S. PATENT DOCUMENTS

| | | | |
|---|---|---|---|
| 3,419,593 | 12/1968 | Willing | 260/448.2 |
| 3,445,520 | 5/1969 | Callahan | 260/604 |
| 3,731,358 | 5/1973 | Artl | 29/132 |
| 3,964,431 | 6/1976 | Namiki | 118/60 |
| 3,976,814 | 8/1976 | Murphy | 427/226 |
| 3,997,691 | 12/1976 | Murphy | 427/195 |
| 4,000,390 | 12/1976 | Murphy | 427/195 |
| 4,019,024 | 4/1977 | Namiki | 219/469 |
| 4,054,410 | 10/1977 | Murphy | 432/60 |
| 4,056,706 | 11/1977 | Strella | 219/216 |
| 4,074,001 | 2/1978 | Imai et al. | 428/329 |
| 4,075,390 | 2/1978 | Murphy | 428/307 |
| 4,107,389 | 8/1978 | Murphy | 428/447 |
| 4,108,825 | 8/1978 | Hayes | 260/37 SB |
| 4,126,722 | 11/1978 | Murphy | 428/339 |
| 4,162,243 | 7/1979 | Lee et al. | 262/17 |
| 4,185,140 | 1/1980 | Strella et al. | 428/418 |
| 4,188,423 | 2/1980 | Swift | 427/444 |
| 4,357,388 | 11/1982 | Minor | 428/331 |
| 4,444,944 | 4/1984 | Matsushita | 524/786 |
| 4,463,118 | 7/1984 | Evans et al. | 524/264 |

*Primary Examiner*—John L. Goodrow

[57] ABSTRACT

A fusing assembly for use in an electrostatographic imaging apparatus includes a release agent donor member having a conformable donor surface comprising the crosslinked product of at least one addition curable vinyl terminated or vinyl pendant polyorganosiloxane having the formula:

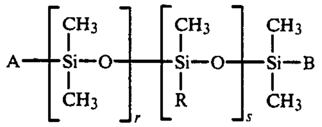

where A,B and R are methyl or vinyl provided the vinyl functionality is at least 2, $0<s/r\leqq 1,350<r+2<2700$, a polyfunctional silicone hydride crosslinking agent, a crosslinking catalyst and finely divided filler. In a preferred embodiment the conformable donor surface comprises a rotatable cylindrical roll with a high coefficient of friction which is rotatably driven by frictional contact with a positively driven fuser roll. The release agent may be supplied from a sump by a release agent metering roll.

12 Claims, 3 Drawing Figures

RELEASE AGENT DONOR MEMBER AND FUSING ASSEMBLY CONTAINING SAME

CROSS REFERENCE TO RELATED APPLICATIONS

Reference is hereby made to copending application Ser. No. 740,930, filed June 3, 1985, entitled "Heat Stabilized Silicone Elastomers" in the name of George J. Hecks et al. and commonly assigned to the assignee of the present application.

BACKGROUND OF THE INVENTION

The present invention relates generally to electrostatographic printing apparatus and more particularly to a fusing system for fixing toner material to a support substrate. In particular the present invention relates to a release agent donor member for a toner fixing station in such apparatus.

In the process of xerography, a light image of an original to be copied is typically recorded in the form of an electrostatic latent image upon a photosensitive member with subsequent rendering of the latent image visible by the application of electroscopic marking particles commonly referred to in the art as toner. The residual toner image can be either fixed directly upon the photosensitive member or transferred from the member to another support, such as a sheet of plain paper with subsequent affixing of the image thereto.

In order to fix or fuse the toner material onto a support member permanently by heat, it is necessary to elevate the temperature of the toner material to a point at which constituents of the toner material coalesce and become tacky. This action causes the toner to flow to some extent into the fibers or pores of the support members or otherwise upon the surfaces thereof. Thereafter, as the toner material cools, solidification of the toner material occurs causing the toner material to be bonded firmly to the support member.

One approach to thermal fusing of toner material images onto the supporting substrate has been to pass the substrate with the unfused toner images thereon between a pair of opposed roller members at least one of which is internally heated. During operation of a fusing system of this type, the support member to which the toner images are electrostatically adhered is moved through the nip formed between the rolls with the toner image contacting the fuser roll thereby to affect heating of the toner images within the nip. Typical of such fusing devices are two roll systems wherein the fusing roll is coated with an abhesive material, such as a silicone rubber or other low surface energy elastomer or, for example, tetrafluoroethylene resin sold by E. I. duPont De Nemours under the trademark Teflon. The silicone rubbers which have been used as the surface of the fuser member can be classified into three groups according to the vulcanization method and temperature, i.e., room temperature vulcanization silicone rubber hereinafter referred to as RTV silicone rubber, liquid silicone rubber referred to as LSR rubber, and high temperature vulcanization type silicone rubber referred to as HTV rubber. All these silicone rubbers or elastomers are well known in the art and are commercially available.

In these fusing systems, however, since the toner image is tackified by heat it frequently happens that a part of the image carried on the supporting substrate will be retained by the heated fuser roller and not penetrate into the substrate surface. This tackified material will stick to the surface of the fusing roller and come in contact with the subsequent sheet of supporting substrate bearing a toner image to be fused. A tackified image which has been partially removed from the first sheet, may transfer to the second sheet in non-image portions of the second sheet. In addition, a portion of the tackified image of the second sheet may also adhere to the heated fuser roller. In this way and with the fusing of subsequent sheets of substrates bearing the toner images, the fuser roller may be thoroughly contaminated. In addition, since the fuser roller continues to rotate when there is no substrate bearing a toner image to be fused there between, toner may be transferred from the fuser roll to the pressure roll. These conditions are referred to in the copying art as "offset". Attempts have been made to control the heat transfer to the toner and thereby control the offset. However, even with the abhesive surfaces provided by the silicone elastomers, this has not been entirely successful.

It has also been proposed to provide toner release agents such as silicone oil, in particular, polydimethyl silicone oil, which is applied on the fuser roll to a thickness of the order of about 1 micron to act as a toner release material. These materials possess a relatively low surface energy and have been found to be materials that are suitable for use in the heated fuser roll environment. In practice, a thin layer of silicone oil is applied to the surface of the heated roll to form an interface between the roll surface and the toner image carried on the support material. Thus, a low surface energy, easily parted layer is presented to the toners that pass through the fuser nip and thereby prevents toner from offsetting to the fuser roll surface.

According to prior art techniques, the toner release agents may be applied to the fuser roll by several delivery mechanisms including wicking impregnate webs and by way of a donor roll. One technique in particular has been the use of high temperature vulcanized silicone rubber which are peroxide cured materials. These silicone rubber donor rolls however suffer from difficulty in that they swell by being in contact with the silicone oil which migrates or is absorbed into the silicone rubber. While a small degree of swelling may be acceptable if it is uniform, failure of such rolls has been observed by excessive swelling after a period of operation of about 1 month wherein the donor roll elastomer may actually be twice the original size. Under such circumstances the silicone rubber donor roll may no longer function in providing a uniform layer of release fluid to the fuser roll.

In another embodiment the donor roll may comprise an EPDM (terpolymer elastomer made from ethylene, propylene and diene monomer) core with a thin sleeve of Teflon PFA (E. I. du Pont De Nemours) which is an independent extruded thin sleeve of material which is bonded onto the core. The use of such a sleeve is very expensive and the manufacturing of such a donor roll, is tedious and inefficient, the yield being relatively low since so many of the sleeves are damaged during manufacture. Furthermore, in a fusing assembly such as that illustrated in FIG. 1, which will be described in greater detail hereinafter, such a sleeved donor roll is ineffective in that since the donor roll is driven by frictional engagement with the fuser roll, and the hard Teflon PFA coating has a relatively low coefficient of friction difficulties are presented in providing the necessary driving component.

PRIOR ART

U.S. Pat. No. 4,357,388 (Minor)—is directed to a dry release hot roll fuser whose elastomeric outer surface is formed of an addition curing polymethylvinylsiloxane where the vinyl groups are terminating groups and a blend of the polymer with polymethylhydrogensiloxane in which the hydride function is greater than 2.

U.S. Pat. No. 3,964,431 (Namiki)—describes an offset preventing liquid supply roller made of foam silicone rubber impregnated with silicone oil or other offset preventing liquid.

U.S. Pat. No. 4,056,706 (Strella)—describes an offset preventing fluid supply roll for use in a copier wherein a supply roll may be made from a silicone rubber which can be impregnated with an offset preventing fluid, or liquid or may be a suitable polymeric material which degrades or decomposes or reacts to form by a reaction mechanism an offset preventing fluid.

SUMMARY OF THE INVENTION

In accordance with the present invention a conformable silicone rubber release agent donor surface is provided.

In accordance with an additional aspect of the present invention a fusing assembly for a electrostatographic imaging apparatus is provided.

In accordance with an additional aspect of the present invention a relatively inexpensive, easily fabricated release agent donor member is provided.

In accordance with another aspect of the present invention a release agent donor member having a high coefficient of friction is provided.

In accordance with a further aspect of the present invention a silicone rubber release agent donor member of improved dimensional stability and long operational life is provided.

In accordance with a further aspect of the present invention the silicone rubber release agent donor roll may include a polyorganosiloxane oil in the silicone rubber layer.

In a specific aspect of the present invention a release agent donor member for the toner fixing station in an electrostatographic imaging apparatus has a conformable donor surface preferably a roll comprising the crosslinked product of;

(a) at least one addition curable vinyl terminated or vinyl pendant polyorganosiloxane having the formula:

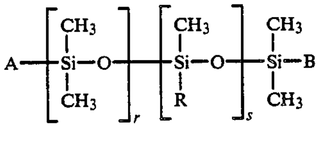

where A, B and R are methyl or vinyl provided the vinyl functionality is at least 2, $0<s/r\leqq 1$, $350<r+s<2700$;

(b) from about 5 to about 150 parts by weight per hundred parts of polyorganosiloxane of finely divided filler;

(c) a polyfunctional silicone hydride crosslinking agent;

(d) a crosslinking catalyst; said crosslinking agent and catalyst being present in an amount sufficient to promote crosslinking of said polyorganosiloxane.

DESCRIPTION OF THE PREFERRED EMBODIMENT

The invention will now be described with reference to a preferred embodiment of fusing assembly employing a release agent donor member according to the present invention.

Figure 1:
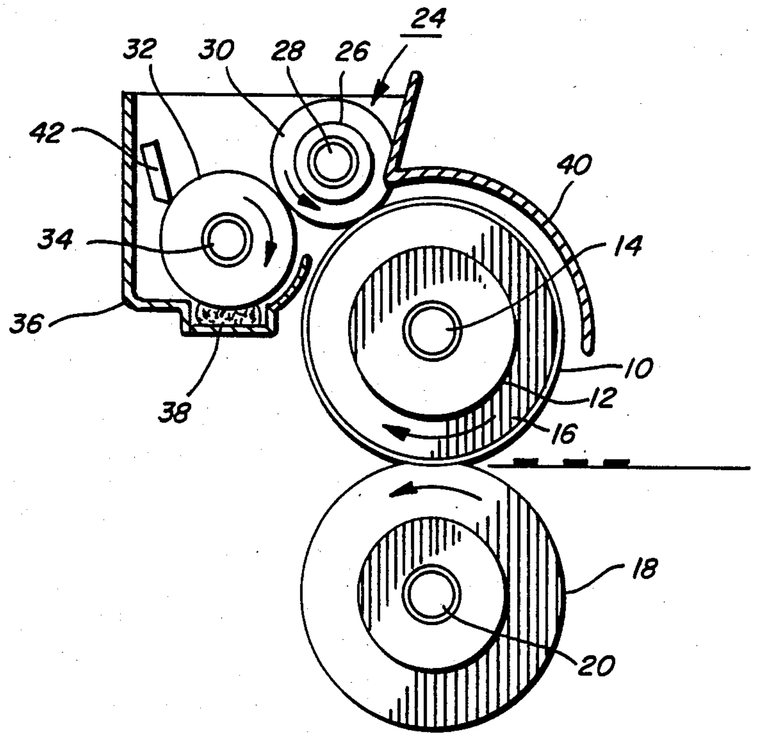
FIG. 1 is a schematic representation in cross section of portions of an electrostatographic printing machine fusing assembly employing a release agent donor member according to the present invention.

FIG. 1 shows a fusing assembly comprising the rotatably mounted fuser roll 10 in pressure contact with a pressure roll 18, the fuser roll 10 having delivered to it release fluid by means of release fluid donor or transport roll 24 which in turn is supplied with release fluid by means of delivery roll 32. More specifically, the fuser roll 10 is comprised of a central core 12 which may be rotatably driven by drive means on either side of the roll by the main machine drive. Core 12 has a layer 16 of abhesive fusing material such as a silicone rubber or other low surface energy elastomer, for example, tetrafluoroethylene resin sold by E. I. du Pont de Nemours under the tradename Teflon. Alternatively, the abhesive material may be Viton. Positioned interior of the abhesive fusing layer is a heating element 14 such as those well known in the prior art and may comprise, for example, a quartz heater made of a quartz envelope having a tungsten resistance heating element disposed internally thereof. The fuser roll is shown in pressure contact arrangement with a backup or pressure roll 18 which comprises a metal core 20 with a layer of heat resistance material thereon such as, Viton or silicone rubber. Both the fuser roll 10 and pressure roll 18 may be mounted on shafts which are biased so that the fuser roll 10 and the pressure roll 18 are pressed against each other under sufficient pressure to form a nip. It is in this nip that the fusing action takes place. Alternatively the fuser and pressure rolls may have integral journals for mounting. The release agent donor roll 24 is rotatably mounted on shaft 28 and comprises a solid or hollow cylindrical core member 26 having the conformable donor surface layer 30 coated thereon. In contact with the release agent donor roll 24 is a release fluid delivery roll 32 which may be made of any suitable material such as, chrome plated steel roll. It will be noted that this roll supplies release fluid by contact with the release agent donor roll 24 at a position remote from contact nip between the fuser roll and the release agent donor roll. At the bottom of the release agent delivery roll is a sump 38 containing therein a release agent fluid to be supplied to the fuser roll 10. As the delivery roll rotates in the direction of the arrow through the sump it is loaded with release fluid the thickness of which is metered by metering blade 42. The sump, delivery roll, release agent donor roll and metering blade are contained within a housing 36 a portion of which extends arcuately around the fuser roll as a protective cover 40.

In operation the four rolls may be independently driven or according to a preferred embodiment of the present invention, the drive input is directed to the fuser roll 10 with the release agent donor roll 24 being driven by frictional contact with the surface of the fuser roll and the oil metering roll 32 being driven by frictional contact with the release agent donor roll 24 in the direction indicated by the arrows in FIG. 1. The pressure roll 18 may also be driven by frictional control with the fuser roll thereby forming the fusing nip therebetween it and fuser roll 10. A release agent delivering roll 32 delivers release agent from the sump 38 to the surface of the release agent donor roll 24 and by film splitting at the nip of the delivery roll and donor roll delivers an amount of the release agent to the surface of donor roll 24. As the donor roll rotates in contact with the fuser roll the thin film of release agent on the donor roll 24 is split with a portion about 50 percent being transferred to the fuser roll 10, and a portion being retained on the donor roll 24.

The release agent donor roll according to the present invention may comprise a shaft with a solid or hollow cylinder about 8 millimeters to 22 millimeters in diameter and a conformable donor surface coating from 1 to 6 millimeters in thickness. The surface coating may be even thicker if desired to adjust for certain nip characteristics. Typically the rolls are from about 12 to 18 inches in length. According to the present invention the conformable surface layer comprises the crosslinked product of;

(a) at least one addition curable vinyl terminated or vinyl pendant polyorganosiloxane having the formula:

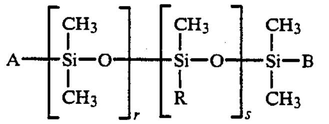

where A, B and R are methyl or vinyl provided the vinyl functionality is at least 2, $0<s/r\leqq 1, 350<r+s<2700$;

(b) from about 5 to about 150 parts by weight per 100 parts polyorganosiloxane of finely divided filler;

(c) a polyfunctional silicon hydride crosslinker;

(d) a crosslinking catalyst, with the crosslinking agent and catalyst being present in an amount sufficient to crosslinking of the polyorganosiloxane. By the term the vinyl functionality is at least 2, it is meant that in the formula for each molecule there must be at least a total of 2 vinyl groups in the A, B or any of the R sites within the formula.

With polyorganosiloxanes represented by the formula above in the presence of suitable catalysts such as solutions or complexes of chloroplatinic acids or other platinum compounds in alcohol, ether or divinylsiloxanes, reaction occurs at temperatures of 100° C. to 250° C. with the addition of the polyfunctional silicon hydride to the unsaturated groups in the polysiloxane chain. Typical hydride crosslinkers are methyl, hydrodimethylsiloxane polymers with about 15 to 70 percent methylhydrogen. Elastomers so produced exhibit increased toughness, tensile strength and dimensional stability. Typically, these materials are prepared by the addition of two separate parts of the formulation, part A containing the vinyl terminated or pendant polyorganosiloxane, the catalyst and the filler; part B containing the same or another vinyl terminated or pendant polyorganosiloxane, the crosslink moiety such as a hydride functional silane and the same or additional filler where part A and part B are normally in a one to one ratio. Typical of the materials which may be employed in the practice of the present invention are those commercially available from Dow Corning under the designation Silastic 590, 591, 595, 596, 598. In addition, similar materials are available from General Electric Corporation under the designation GE 2300, 2400, 2500, 2600 and 2700. During the addition curing operation, the material is crosslinked by the equation $\equiv SiH + CH_2{=}CHSi\equiv \rightarrow \equiv SiCH_2CH_2Si\equiv$. Since hydrogen is added across the double bond no offensive byproducts such as acids or alcohol is obtained.

The composition also includes typical filler materials to provide mechanical strength as well as desired thermal properties. Typically, from about 5 to 150 parts by weight of finely divided filler is present per 100 parts by weight of polyorganosiloxane. Typical of the materials that may be used as filler materials are the reinforced and nonreinforcing calcined alumina, tabular alumina as well as several forms of silica such as fumed silica, silica aerogel, calcined diatomaceous silica, and ground silica. The size of the filler material is preferred to be not larger than about 325 mesh in size in order to be uniformly dispersed throughout the composition.

Typically, the release agent donor rolls may be made by injection, compression molding, transfer molding or they may be extruded or, alternatively, may be sprayed on in a thin thickness. They have the advantage with thin layer thickness of being able to be cured in from a few seconds to a very few minutes. In a typical procedure the core upon which the conformable donor surface layer is to be formed is degreased, for example, with 1,1,1 trichloroethylene and if desired may be grit blasted. However, it has been found that better adhesion of the polysiloxane layer may be obtained without grit blasting. Thereafter a suitable primer such as a silane primer identified as GE primer 4155 or 4120 may be applied to the core and dried. Then the core may be placed in the mold, the mixture of the A and B components identified above added directly to the mold and allowed to cure. Depending on the thickness of the layer and the temperature, the cure can take from about 15 seconds to several hours. Typically for a layer about 6 millimeters in thickness, curing may be accomplished in 1 to 4 minutes. After curing the roll is removed from the mold and post cured at one hour in a heated oven at 400° F. Upon removal it is possible that some flashing or runner may have to be removed from the roll.

Alternatively and in a preferred application of the present invention, polydimethylsilicone fluid having a viscosity of about 50 to about 25,000 centistokes may be added to part A and part B components of the liquid addition curable polyorganosiloxane. Typically from about 10 to about 60 parts by weight per 100 parts by weight of polyorganosiloxane elastomer of such a silicone fluid may be added. Readily available materials for this purpose include Dow Corning 200 silicone fluid having a viscosity of 100 centistokes. With the addition of oil of course, the physical properties of the resulting elastomeric composition may be altered. For example, by the addition of the silicone oil, the hardness, tensile strength, elongation and tear are reduced which have a tendency to lower operational life of the roll. However, the addition of the silicone oil minimizes the effect of swell and accordingly, an appropriate balance may be struck between the degradation of physical properties with silicone elastomer swell.

It is known that there is a driving force generally for low molecular weight materials to dilute or penetrate the structure of higher molecular weight materials. By incorporating low molecular weight oil in the polymer prior to cross linking you have a predilution of the cross linked elastomer thus reducing the potential for further dilution in contact with an additional low molecular weight material. With the potential for additional dilution reduced the overall swell of the elastomer is reduced. Accordingly, it is preferred to add a silicone oil during the donor member fabrication step having a viscosity about the same as that of the release fluid with which it is used to achieve maximum reduction in swelling due to the subsequent contact of the cured elastomer with the silicone release fluid.

Any suitable fuser roll can be used in the practice of the present invention. As indicated previously, typical fuser rolls include those made from silicone rubbers, fluoroelastomer based on the copolymer of the vinylidene fluoride and hexafluoropropylene such as Viton trademark of E. I. DuPont de Nemours & Co., tetrafluoroethylene fluorocarbon polymers such as Teflon also trademark of E. I. DuPont de Nemours & Co. Furthermore the pressure roll may be made of any suitable material and typically may be selected from the above group of materials as used for the fuser roll.

The release agent donor roll according to the present invention may be used to transport any suitable release fluid to the fuser roll. Typically these are silicone based oils (polydimethylsiloxanes) which possess relatively low surface energy, can be applied as a thin layer to the heated roll to form an interface between the roll surface and the toner images carried on the support material. Accordingly, a low surface energy layer is presented to the toner as it passes through the fuser nip and thereby prevents toner from offsetting to the fuser roll surface. In addition, polymeric release fluids may contain chemical reactive functional groups such as carboxy, hydroxy, epoxy, amino, isocyanate, thioether, mercapto and the like, and combinations thereof as described in U.S. Pat. No. 4,185,140 to Strella et al. With such functional fluids and while the mechanism is not completely understood, it is believed that there is an interaction (a chemical reaction, coordination complex, hydrogen bonding or other mechanisms) between the surface of the fuser roll and the polymeric fluid having functional groups so that an interfacial barrier layer comprising the reaction product between metal, glass or other material in the fuser member and a functional polymeric fluid forms a barrier layer between the fuser member and the outer layer of the polymeric fluid coating the fuser member.

The invention will now be described with reference to the following specific examples. Unless otherwise specified all percentages in the examples and the remainder of the specification are by weight. In the examples which follow it should be noted that examples 1 and 2 are presented for comparative purposes only.

EXAMPLE 1

A section was taken from a roll prepared from 100 parts of a conventional peroxide cured HTV silicone rubber HTV—Dow Corning Silicone 437 together with about 25 parts Dow Corning 400, 4 parts iron oxide and 1.2 parts Varox, a peroxide curing agent available from R. T. Vanderbilt, Norwalk, Conn.

EXAMPLES 2-7

ASTM test buttons about 1 inch in diameter and ½ inch thick were compression molded from the following compositions:

EXAMPLE 2

Ames, 7940A Silicon Rubber. This is a commercially available HTV material available from Ames Rubber Company, Hamburg, N.J.

EXAMPLE 3

General Electric 2700 supplied by General Electric Company, Schenectady, N.Y., an addition curing liquid polyorganosiloxane which is supplied as two separate paste like liquid parts, part A and part B. Part A is generically believed to be a polymethylvinylsiloxane polymer where the vinyl groups are terminating groups and specifically, alpha omega bis-methylvinylsiloxy polydimethylsiloxane, about 50 percent by weight of filler and a small amount of platinum catalyst. Part B is believed to be a blended polymer including the polymethylvinylsiloxane polymer in part A together with a polyfunctional silicon hydride in which the hydride function is greater than 2, and about 36 percent by weight of filler. In preparing this sample, to 50 parts by weight of each of part A and part B when mixed together, 35 parts by weight of silicone oil Dow Corning 200 (21 K centistokes) was added and mixed in.

EXAMPLE 4

Example 3 is repeated except that, the silicone oil added to the paste and mixed with the paste of part A and part B prior to molding was Dow Corning 200 (100 centistokes) silicone oil.

EXAMPLE 5

Dow Silastic 595 supplied by Dow Corning, Midland, Mich., an addition curing liquid polyorganosiloxane is supplied as two separate translucent paste like liquid parts, part A and part B. Part A is generically believed to be a polymethylvinylsiloxane polymer where the vinyl groups are terminating groups and specifically, alpha omega bis-dimethylvinylsiloxy polydimethylsiloxane having a weight average molecular weight of about 64,000, a molecular weight distribution of about 2.8, and a weight average angstrom size of 1566 as determined by gel permeation chromotography, about 20 percent by weight of reinforcing fumed silica, a small amount of platinum catalyst. Part B is believed to be a blended polymer including the polymethylvinylsiloxane polymer in part A, together with a polyfunctional silicon hydride, in which the hydride function is greater than 2 and having a weight average molecular weight of about 63,000, a molecular weight distribution of about 2.5, a weight average angstrom molecular size of 1550 as determined by gel permeation chromotography, and about 70 percent by weight of reinforcing fumed silica. 50 parts each of part A and part B were mixed together prior to molding.

EXAMPLE 6

Example 4 is repeated, except that 50 parts by weight of Dow Corning 200 (100 centistokes) silicone oil are added and mixed into the mixture of part A and part B prior to molding.

EXAMPLE 7

Example 5 is repeated, except that to 50 parts each of part A and part B, of the Dow Silastic 595, 30 parts by weight of Dow Corning 200 (100 centistokes) silicone oil is added.

Figure 2:
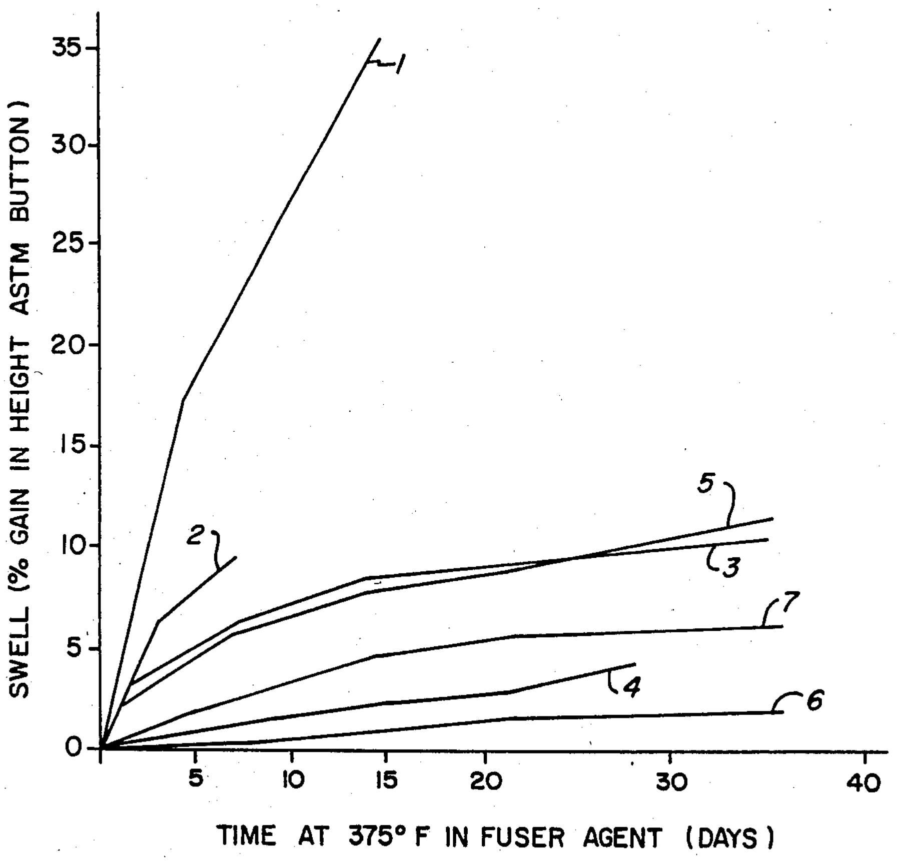
FIGS. 2 and 3 show respectively the swell percent and the durometer of test buttons of material according to the invention when immersed in a fuser agent at elevated temperature.

Following mixing of all the ingredients, test buttons were molded after which they were subjected to a post cure for about one hour in an oven at about 400° F. Following the post cure, the test buttons were immersed in a mercapto functional silicone oil (Xerox Fuser Agent #8R 882) having a viscosity of 200 centistokes; at 375° F. and their swell and hardness (Shore A durometer) tested for 50 days. The results of these tests are graphically illustrated in FIGS. 2 and 3. As may be observed from FIG. 2, the conventional condensation cured HTV silicone rubbers exhibited excessive swell within a very short period of time. No good measurement was achieved in Example 2 after 7 days since it had already excessively degraded by swelling.

In contrast the examples according to the present invention exhibited a relatively lower swell rate over a longer period of time. It being noted that at the end of 35 days none of them had exceeded 10 percent dimensional swell.

Figure 3:
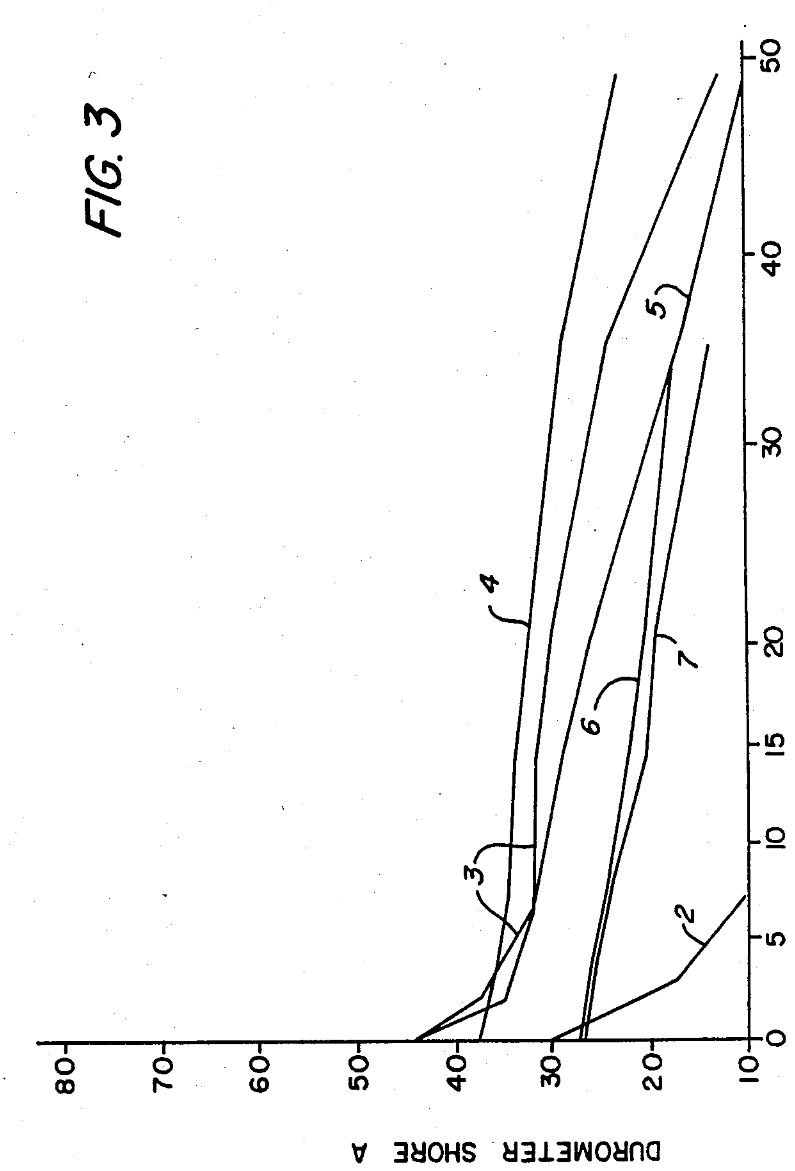

Reference to FIG. 3 indicates that while the examples according to the present invention, 3–7, showed a decrease in the hardness for a time when immersed in the fuser agent at elevated temperature, this decrease was gradual and took place over an extended period of time. In contrast, comparative example 2 directed to the peroxide cured HTV silicone rubbers had a rapid reduction in hardness, becoming functionally unsuitable within about 7 days.

EXAMPLES 8–9

Two rolls were prepared for testing in a Xerox 9500 fuser fixture similar to that illustrated in FIG. 1. The first roll (Example 8) was prepared from the same formulation employed as in example 4. The second roll (Example 9) was prepared from Dow Silastic 590 by Dow Corning, Midland, Mich., an addition curing polyorganosiloxane supplied a two separate paste like parts, part A and part B. Part A is believed to be generically polymethylvinylsiloxane polymer with a vinyl are terminating group and specifically, alpha omega bisdimethylvinylsiloxy polydimethylsiloxane having about 29 percent by weight of silica and a small amount of platinum catalyst. Part B is believed to be a blended polymer including polyvinylsiloxane polymer in part A, together with a polyfunctional silicon hydride, in which the hydride function is greater than 2 and containing about 29 percent by weight of silica. To 50 parts each of part A and part B in both examples 8 and 9, 35 parts by weight of 100 centistokes silicone oil were added and mixed. Following mixing, the mixture was injected into a mold that already contained a hollow steel tube with a shaft through the center mounted on bearings. The inside diameter of the steel tube was 22 millimeters, the outside diameter of the coated roll 34 millimeters and a coating of about 6 millimeters was provided. Following molding, the molded rolls were removed, subjected to a post cure for about 1 hour in an oven at 400° F. to stabilize roll properties. Both rolls were tested in the fixture for 5200 hours running at about a 10 percent duty cycle, the equivalent of about 2 years operation. While they did exhibit some swell, they remained intack and in contact and continued to function during this entire period of time. In addition the roll in example 8 was tested in machine producing copies and functioned well for over 400,000 copies without failure or significant swell. By comparision, conventional peroxide cured HTV silicone rubber when fabricated in a similar manner and placed in the test fixture, failed after two months by swelling, the physical dimensions of the elastomeric coating actually doubled which made it impossible to operate the roll without destroying it. In addition to the functionality of such rolls being lost by a large dimensional change, it may also be lost by the roll surface becoming tacky or gummy to the extent of some of it appearing on the copies. Further with a tacky surface the opportunity for contamination by dirt and debris is dramatically insured.

In the Examples above, the composition prepared by mixing parts A and B of Dow Silastic 595 is believed to be claimed in U.S. Pat. Nos. 3,445,420 and 4,162,243 and the composition prepared by mixing parts A and B of Dow Silastic 590 is believed to be claimed in U.S. Pat. Nos. 3,445,420 and 4,108,825.

According to the present invention, a novel release agent donor member and fusing assembly employing same have been provided which has acceptable dimensional stability when used with silicone oil based fuser agents. Donor members swell at acceptable rate levels, continuing to be able to function up to about 15 to 20 percent swelling. Further, the release agent donor members as a result of being relatively soft, are conformable and thereby provide the same line contact footprint with the fuser roll at lower pressure loadings. In addition, the release agent donor member according to the present invention is stable to temperature in that it is capable of withstanding line contact with the fuser roll at a temperature of at least 357° F. without losing its physical integrity. In addition, the release agent donor member has a reduced tendency to accumulate toner, paper and other machine debris compared to the previously used peroxide cured polyorganosiloxanes.

All the patents referred to herein are hereby specifically and totally incorporated by reference in their entirety in the instant specification.

While the invention has been described in detail with reference to specific and preferred embodiments, it will be appreciated that various modifications and variations will be apparent to the artisan. For example, while the invention has been described with reference to a release agent donor roll, it will be appreciated in other configurations such as a belt could be used. All such modifications and embodiments that may readily occur to one skilled in the art are intended to be within the scope of the appended claims.

What is claimed is:

1. A release agent donor member for a toner fixing system in an electrostatographic imaging apparatus having a conformable donor surface layer comprising the crosslinked product of:

(a) at least one addition curable vinyl terminated or vinyl pendant polyorganosiloxane having the formula of:

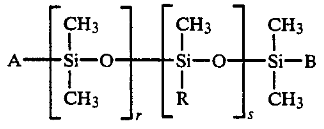

where A, B and R are methyl or vinyl provided the vinyl functionality is at least 2, $0<s/r\leqq 1$, $350<r+s<2700$;

(b) from about 5 to about 150 parts by weight per hundred parts of polyorganosiloxane of finely divided filler;

(c) a polyfunctional silicon hydride crosslinking agent;

(d) a crosslinking catalyst, said crosslinking agent and catalyst being present in an amount sufficient to promote crosslinking of said polyorganosiloxane.

2. The member of claim 1 wherein said conformable donor surface comprises the surface of a rotatable cylindrical roll.

3. The member of claim 1 wherein said crosslinked product includes from about 10 to 60 parts by weight per 100 parts by weight of polyorganosiloxane elastomer of a polyorganosiloxane oil release agent having a viscosity of from about 50 to about 25,000 centistokes.

4. The member of claim 1 wherein said crosslinking agent is a methylhydrodimethylsiloxane copolymer with from about 20 to about 60 percent methylhydrogen.

5. A fusing assembly for use in an electrostatographic imaging apparatus comprising;

(A) a heated fuser roll;

(B) a pressure roller engaging said fuser roller to provide a nip therebetween through which a copy sheet having an unfused toner image may be passed to fuse said toner image by contact with said heated fuser roll;

(C) a release agent donor member having a conformable donor surface in contact with said fuser roll said donor surface comprising the crosslinked product of:

(a) at least one addition curable vinyl terminated or vinyl pendant polyorganosiloxane having the formula of:

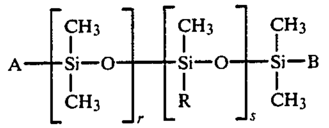

where A, B and R are methyl or vinyl provided the vinyl functionality is at least 2, $0<s/r\leqq 1$, $350<r+s<2700$;

(b) from about 5 to about 150 parts by weight per hundred parts of polyorganosiloxane of finely divided filler;

(c) a polyfunctional silicon hydride crosslinking agent;

(d) a crosslinking catalyst, such crosslinking agent and catalyst being present in an amount sufficient to promote crosslinking of said polyorganosiloxane;

(D) means to supply a uniform layer of release agent to said release agent donor member.

6. The fusing assembly of claim 5 wherein said conformable donor surface comprises the surface of a rotatable cylindrical roll.

7. The fusing assembly of claim 5 wherein said crosslinked product includes from about 10 to about 60 parts by weight per 100 parts by weight of polyorganosiloxane elstomer of a polyorganosiloxane oil release agent having a viscosity of from about 50 to about 25,000 centistokes.

8. The fusing assembly of claim 5 wherein said crosslinking agent is a methylhydrodimethylsiloxane copolymer with from about 20 to about 60 percent methylhydrogen.

9. The fusing assembly of claim 5 wherein said fuser roll is positively driven and said donor roll is rotatably driven by frictional contact with said fuser roll.

10. The fuser assembly of claim 9 including a release agent sump and a release agent delivery roll for delivering release fluid from said sump to said donor roll.

11. The fusing assembly of claim 10 wherein said release agent is a silicone oil.

12. The fusing assembly of claim 11 wherein said silicone oil is a mercapto functional silicone oil.

* * * * *